(12) United States Patent
Piazza

(10) Patent No.: US 6,823,771 B2
(45) Date of Patent: Nov. 30, 2004

(54) COFFEE, TEA, AND HERBAL TEA MAKER

(76) Inventor: Pietro Piazza, 99 Villian Trail, Palm Coast, FL (US) 32164

(*) Notice: Subject to any disclaimer, the term of this patent is extended or adjusted under 35 U.S.C. 154(b) by 0 days.

(21) Appl. No.: 10/266,147

(22) Filed: Oct. 8, 2002

(65) Prior Publication Data

US 2004/0065209 A1 Apr. 8, 2004

(51) Int. Cl.[7] .................................................. A47J 31/24
(52) U.S. Cl. ....................................... 99/303; 99/302 P
(58) Field of Search ........................ 99/303, 292, 302 P, 99/287, 308; 426/433

(56) References Cited

U.S. PATENT DOCUMENTS

| | | | | |
|---|---|---|---|---|
| 3,077,156 A | * | 2/1963 | Egi et al. ....................... | 99/285 |
| 3,670,641 A | * | 6/1972 | Mancioli ....................... | 99/293 |
| 5,970,850 A | * | 10/1999 | Piazza ........................... | 99/303 |

\* cited by examiner

Primary Examiner—Reginald L. Alexander
(74) Attorney, Agent, or Firm—Elsie C. Turner

(57) ABSTRACT

A device for hot beverages, such as coffee, tea, herbal tea, comprises a lower container for receiving water, an upper container for receiving brewed beverages, and a grounds holder assembly with an injector differential system, into which coffee ground, tea leaves and herbs are placed. The grounds are subjected to high temperature water and steam, to extract essences and produce a beverage, such as espresso coffee, tea, chamomile and others. The injector differential system has an injector nozzle an injector floating piston in the lower portion of the hollow stem. Pressurized hot water and steam from the lower container flow through the injector nozzle, lifting injector floating piston, at predermined high temperature and pressure, through the holes of lower perforated plate, and then into the grounds for brewing process. The water and stem extract of the grounds pass through inverted funnel and it is collected into the upper cylindrical container.

1 Claim, 3 Drawing Sheets

COFFEE, TEA, AND HERBAL TEA MAKER

FIELD OF INVENTION

This invention relates to devices used for making hot beverages from organic substances, such as ground coffee beans, tea leaves, and herbs in general requiring high temperature and pressure.

BACKGROUND ART

Many prior art of coffee and tea makers are available. There has been a myriad of different type of coffee, tea, and herbs makers throughout the last two centuries, all of which differ from the present invention.

OBJECT OF THE INVENTION

The objects of the instant invention are:
(a) to provide a simple device to extract essences from the coffee grounds, tea and herbs in a quick and efficient method, producing espresso and other varieties of coffee and tea beverages with outstanding flavor,
(b) to provide a coffee and tea maker that requires lesser amount of grounds providing the same or improved brew strength,
(c) to provide a stove top coffee and tea maker which permits the home maker to make espresso coffee, tea, and other herbs without the requirement for an expensive commercial machine;
(d) to provide a coffee and tea maker which can be used easily and conveniently for commercial use;
Still further objects and advantages will become apparent from a consideration of the insuring description and drawings.

SUMMARY OF THE INVENTION

The improved maker for coffee, tea and herbal tea detailed herein has four components, comprising an upper brewed coffee or tea container, a lower water heating container, a coffee or tea brewing assembly which includes a coffee or tea holder having a hollow stern into the lower water heating container, an injector assembly which includes an injector nozzle and an injector floating piston, nested into the lower end of the hollow stern. The four components am threadably assembled into a hermetically sealed unit In practice, the water heated in the lower water heating container, generating steam, passes through the injector nozzle orifice and forces the injector floating piston upwards, at a predetermined pressure and temperature, which opens the orifice of the injector nozzle, allowing the heated water and steam to flow into the grounds, at a pulsating cycle, extracting coffee and tea essences of outstanding flavor.

The invention simplifies the manufacture of a maker for coffee, tea and herbs, and improves the process. (The term "grounds" in the foregoing text is used for simplicity and it is intended to encompass the processing of coffee grounds, tea leaves, herbs and so forth).

The foregoing and other objects, feature and advantages of the invention will become more apparent from the following description of the preferred embodiments and accompanying drawings.

DETAILED DESCRIPTION

The inventive system comprises an injector nozzle and an injector floating piston located at the bottom of the hollow stem of the grounds holder of a coffee, tea and herbal tea maker or similar type grounds.

Figure 1:
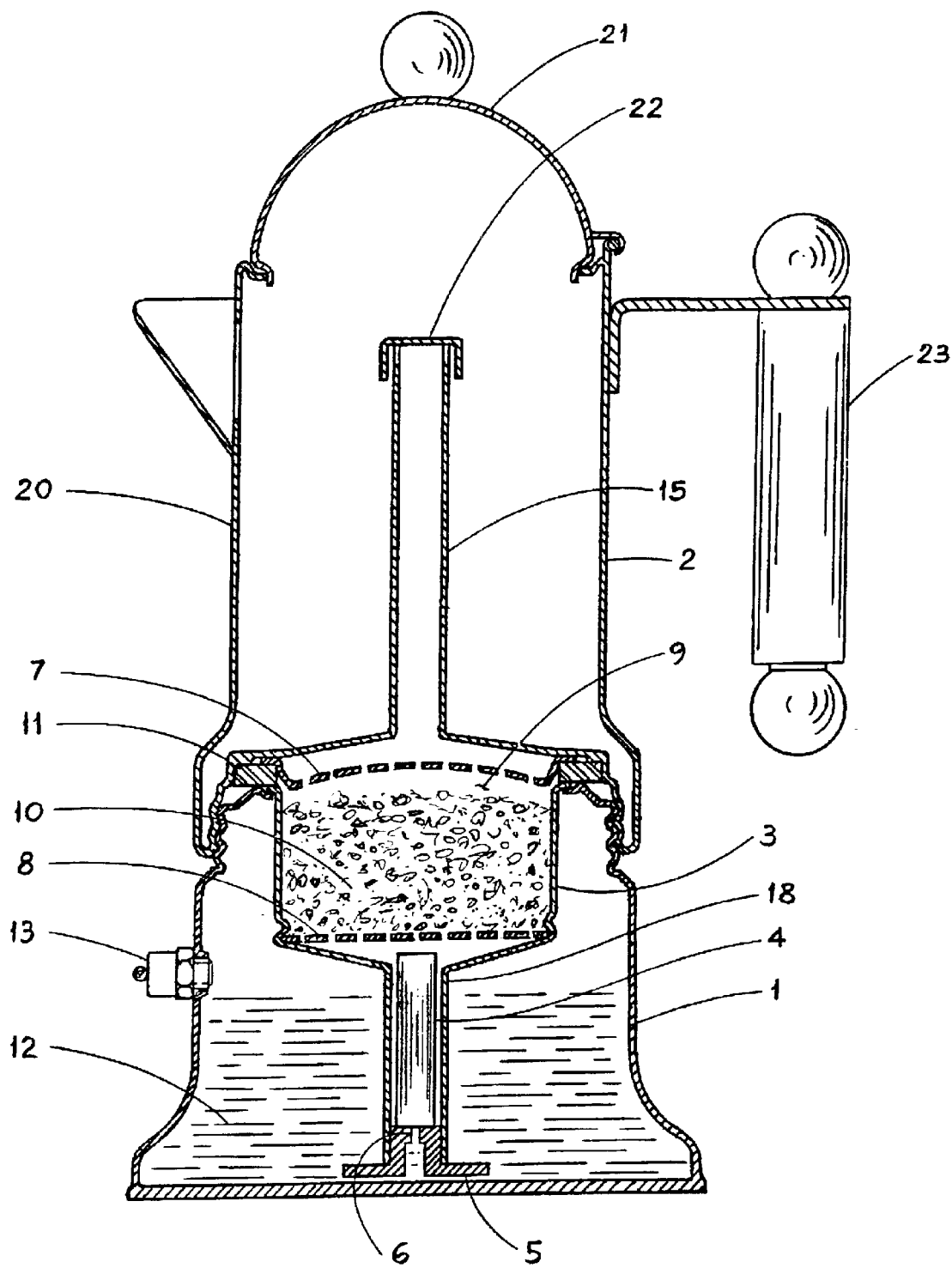
FIG. 1 is a sectional view illustrating the components embodying the invention.

FIG. 1 shows a coffee and tea maker 20 for brewing coffee of different type and teas, which includes a lower cylindrical water heating container 1 having a flat base of a larger diameter at the bottom for heat efficiency, an upper cylindrical container assembly 2, a grounds holder assembly 3 having a hollow stem 18 nested into the lower cylindrical container 1, an injector floating piston 4, an injector nozzle 5 having an orifice 6, nested into the hollow stem 18, upper and lower perforated plates 7 and 8 respectively located in the upper cylindrical container 2, and in the grounds holder assembly 3, a gasket 11 of heat, hot water and steam resistant elastomeric material is nested in the upper cylindrical container 2 to seal the lower water heating container 1 to allow it to be pressurized. The injector floating piston 4, having a diameter smaller than the inside diameter of the hollow stem 18, can slide freely up and down into said hollow stem. The injector nozzle 5 is centered and pressed into the lower portion of the hollow stem 18, for the water and steam to pass only through injector nozzle orifice 6.

Figure 2:
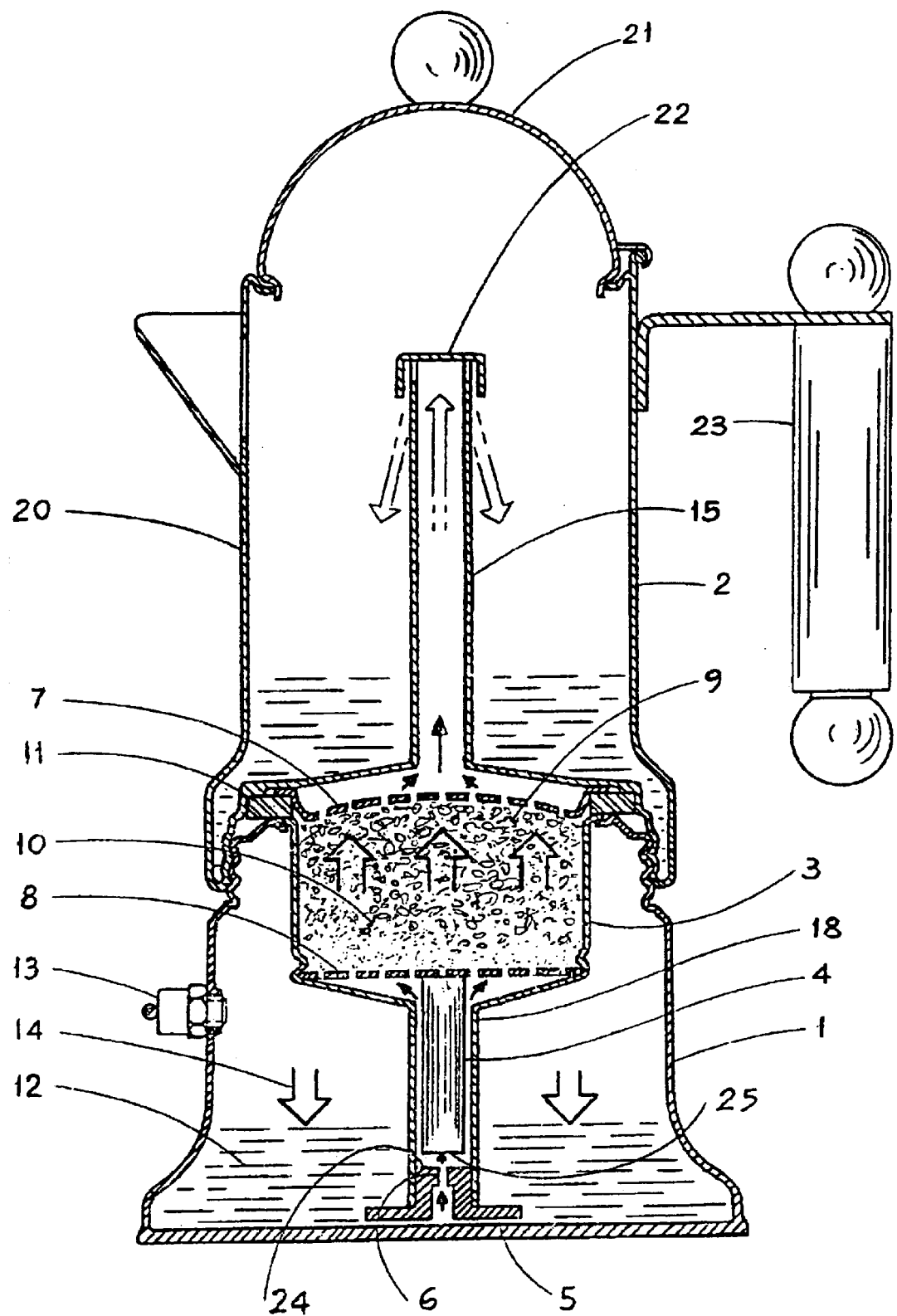
FIG. 2 is a sectional view illustrating the components with the injector floating piston in the up position.

The upper cylindrical container assembly 2 is composed of a lid 21, a handle 23, an integral inverted interior funnel 15 rising vertically from the bottom of said upper cylindrical container, having at its upper end a cap 22 which forces the flow of fluid and steam to go downwards into the lower portion of the upper cylindrical container assembly 2, FIG. 2.

The lower cylindrical water heating container 1 comprises a pressure relieve valve 13, and a cylindrical top having threads extending around the external portion of said top, which engages the threaded bottom of the upper cylindrical container assembly 2. The upper cylindrical container assembly 2 has the cylindrical wall extending beyond the bottom of said container, said extended cylindrical wall having in the internal portion a groove and threads, said groove to receive gasket 11 and said threads to engage and tighten the lower water heating container 1, FIG. 1.

Figure 3:
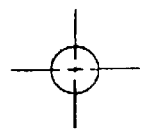
FIG. 3 is a bottom view of the injector floating piston.
Figure 4:
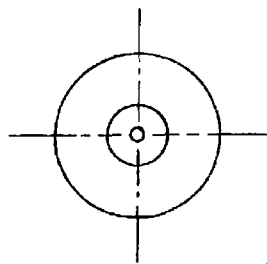
FIG. 4 is a top view of the injector nozzle.

The upper flat surface 24 of the injector nozzle 5, FIG. 4, is finished to a surface texture of 8 microinches, or finer, to allow the lower flat surface 25 of the floating piston 4, FIG. 3, also finished to a surface of 8 microinches, or finer, to close the orifice 6 of the injector nozzle 5; both injector nozzle 5 and injector floating piston 4 are made of mental preferably of stainless steel, which is preferable, also, for all the other components, except where noted.

Figure 5:
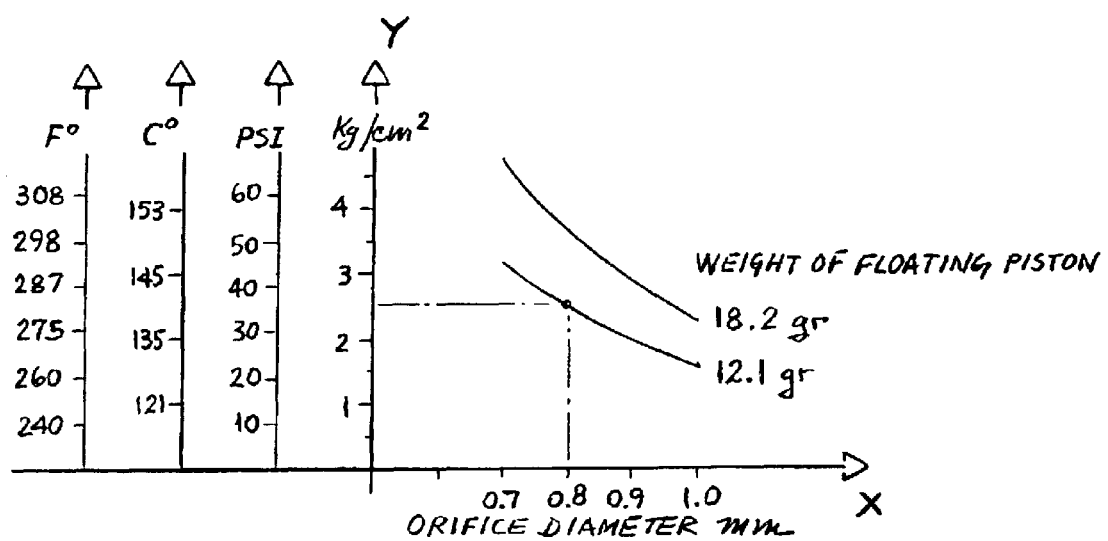
FIG. 5 is a diagram illustrating the nominal theoretical pressure and temperature as function of injector nozzle orifice diameter, at constant mass of injector floating piston.

FIG. 1 and 2, illustrate the position of the injector floating piston during the brewing cycle, FIG. 1 at the beginning of the cycle, and FIG. 2 in the up or open position; FIG. 5 shows the nominal, theoretical pressure/temperature-orifice diameter curve which characterizes the injector nozzle-injector floating piston assembly of the brewer.

In accordance with the principle of this invention, the lower cylindrical water heating container 1 is filled with water 12, for example about 150–200 ml, up to the relief valve 13 set at 4.2 kg/cm2 (60 psi =414 kPa) maximum pressure. Grounds holder assembly 3, with injector nozzle 5 and injector floating piston 4, is positioned in the lower container 1, the grounds chamber 9 is filled partially, or fully, with grounds, whether coffee, tea or herbal tea. The upper cylindrical container assembly 2 is threadedly engaged onto the lower water heating container 1 and tightened to form a hermetic seal. The diameter of the injector nozzle orifice can vary, for practical purposes, from 0.8 to 1.0 mm (0.032 –0.039 inch), the length of the orifice is 1.5 to 2.0 times the diameter of the orifice.

The coffee and tea maker 20 is heated on a burner, or other heating element, as steam 14 develops, hot water 12 is pushed down and forced to enter injector nozzle 5 at the lower end, which stands off 1.0mm from the bottom of the lower container 1, allowing sufficient clearance for the water and stem to enter through orifice 6, forcing upwards floating piston 4, resting on top of upper flat surface 24 of nozzle 5. When the differential pressure between the lower container 1 and the section above the upper flat surface 24 of injector nozzle 5 reaches a predetermined value or setting, the floating piston 4, for example weighing 12.1 gr, is raised at 2.46 kg/cm 2 (35 psi =240 kPa) nominal with the injector nozzle orifice 6 having a diameter of 0.8 mm (0.032 inch), at a temperature of 140° C. (282°F.), allowing the hot water and steam to pass through stem 18 and then through the grounds 10 in chamber 9. As the water and steam passes through the orifice 6, floating piston 4 is pushed up against lower plate 8, at a velocity being a function of the heat rate in the lower container (theoretically this instantaneous velocity, at its peak, is approximately 20 m/s), then falls downwards onto the upper flat surface 24 of nozzle 5, thus closing the orifice 6, due to its mass of inertia and to the force of reaction if impact on the lower surface of the lower perforated plate 8, which does not experience, for practical purpose, deformation, therefore no kinetic energy of the floating piston 4 is absorbed and the impact can be considered elastic, the coefficient of restitution is unity and there is no energy loss. The impact is the collision of the floating piston 4 against the lower surface of the lower perforated plate 8, the linear momentum is practically unchanged. The pressure, a function of the heat rate of the lower container, through the nozzle orifice 6, forces again the floating piston 4, to raise upwards, thus opening the nozzle orifice 6, in an oscillating cycle of opening and closing, similar to the accelerated motion of a pendulum projected on a diameter. The instantaneous oscillating frequency, at its peak, is in the vicinity of 3,000 cycles per second. FIG. 5 illustrates the relationship between the pressure-temperature as a function of the orifice 6 diameter, inversely proportional, at constant mass of floating piston 4. Typically, this pressure ranges between 2.1–3.1 kg/cm2 (30–45 psi =207–310 lPa), with temperature between 120–145 ° C. (250–293 °F.).

In the invention, the high temperature of water and steam injected into the grounds chamber 9 in "quantum", at a pulsation rate being a function of the heat rate, is highly effective in extracting from grounds of coffee, tea, herbs and other organic material, a greater quantity of essence per unit of volume or mass than is achieved when greater than atmospheric pressure is not employed. The high temperature of water and steam is relatively constant during the brewing process, it is a function of the injector pulsating system, not a function of volume or mass of grounds compacted in the chamber, therefore variable amounts of grounds can be used which are exposed to equal temperature. To emphasize this concept, considering a system without the described differential injector system, the heated water and steam will flow through the grounds 10 in chamber 9 at 80–90 C (176–194 F), at practically atmospheric pressure, having to overcome only the resistance of grounds, the result being rinsing grounds with heated water.

The disclosed details are exemplary only and are not to be taken as limitations on this invention, they should not be construed as limiting the scope of this invention, but merely providing illustration of some of the presently preferred embodiments of this invention.

Thus the scope of this invention should be determined by the appended claims and their legal equivalents, rather than the examples given.

What I claim is:

1. In a device for brewing of beverage from grounds during a brewing cycle, the device comprising a lower container assembly having a closed bottom and open top for receiving and heating water, an upper container assembly for receiving brewed beverage, said upper container assembly removably connected and hermetically sealable to said lower container assembly, a grounds basket nested into the top of said lower container assembly and having upper and lower perforated retention plates permitting passage of heated water and steam therethrough to said upper container assembly, said basket having a bottom wall opening to a vertical hollow stem having a lower end extending proximate to the bottom of said lower container assembly, for passage of heated water and steam into said grounds basket, said lower container assembly having a pressure relief valve in the wall thereof, the improvement comprising:

an injector assembly comprising a floating piston, said floating piston being free to slide up and down in said hollow stem and having a lower flat surface to 8 microinch finish, or finer, said injector assembly further comprising a nozzle at the lower end of said hollow stem, the nozzle having an orifice, preferably, of 0.8–1.0 mm (0.32–0.039 inch) diameter and having an upper flat surface to 8 microinch, or finer, whereby said floating piston caps said orifice when resting on said nozzle.

* * * * *